May 5, 1959     D. C. JAXTHEIMER ET AL     2,884,945
PURGE SYSTEM FOR WATER ACTIVATED BATTERY
Filed Oct. 15, 1956     2 Sheets-Sheet 1

Don C. Jaxtheimer
Starr W. Cahill
Lester E. Simon
INVENTORS

BY

ATTORNEY

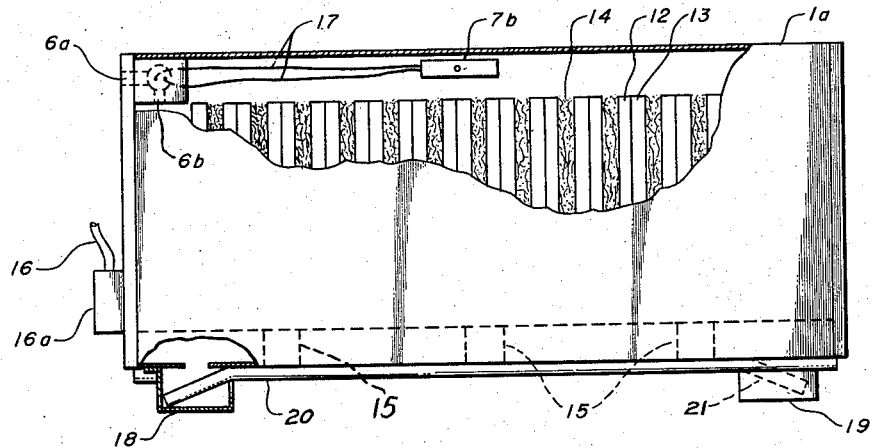
FIG. 3
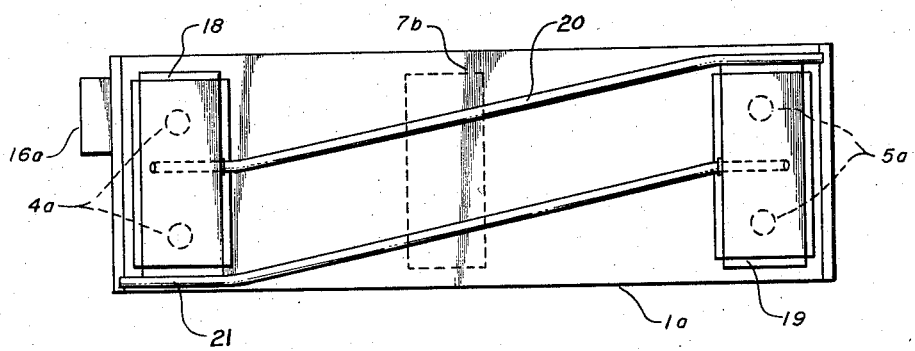
FIG. 4
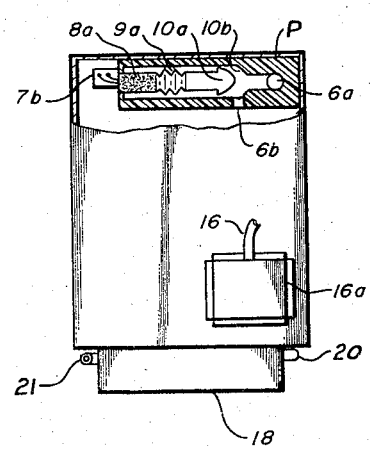
FIG. 5
Don C. Jaxtheimer
Starr W. Cahill
Lester E. Simon
INVENTORS
ATTORNEY

United States Patent Office 2,884,945
Patented May 5, 1959

2,884,945

PURGE SYSTEM FOR WATER ACTIVATED BATTERY

Don C. Jaxtheimer, Pasadena, Starr W. Cahill, Arcadia, and Lester E. Simon, Glendora, Calif., assignors to Hycon Mfg. Company, Pasadena, Calif., a corporation of Delaware Application October 15, 1956, Serial No. 615,993

6 Claims. (Cl. 137—206)

The present invention relates generally to water activated batteries and more particularly to a purge system for water activated batteries.

In a form of water activated battery having magnesium and cuprous chloride electrode plates, for example, and highly absorbent separators, such as cotton pads, sea water is usually supplied as the electrolyte because these batteries are generally used with radio transmitters mounted on floats that are dropped in the open sea, or some other large body of water. The battery is mounted below the water line of a float and is capable of rapid activation following immersion when the float is dropped into water. The activated battery delivers electrical energy at a fairly high rate for operating the transmitter and therefore has a relatively short life, for example, on the order of 70 or 80 hours. Hydrogen gas is continuously generated internally following activation of the battery, developing pressures which force the water out through suitable exhaust ports and keep the water out for the life of the battery. The water must be completely forced out of the battery, leaving only the saturated separators, otherwise remaining water would short out some of the plates. This is particularly difficult to accomplish with floats placed in choppy waters mounting water activated batteries having conventional exhaust ports.

It is an object of this invention to provide a novel purge system for water activated batteries in which the activating water can be completely expelled by internally generated gases.

Another object of the invention is to provide a purge system for water activated batteries which is fully effective either with floats placed in very choppy waters, or with floats riding in still water with any degree of list to one side or the other.

A further object of this invention is to provide a simple yet effective purge system that can be used with conventional water activated batteries.

Briefly, the foregoing objects are preferably accomplished by providing enclosures at both ends of a water activated battery for enclosing and sealing the exhaust ports located at the two ends of the battery. Separate discharge tubings having intake ends connecting respectively with each opposite end enclosures extend back the length of the battery such that the discharge end opening of each tubing is located substantially at the intake end of the other tubing. The exhaust ports are thus effectively reversed in position, and the instantaneous lower end of the battery is brought to a lower water level than the discharge end of the corresponding tubing, so that water collecting at the lower end of the tilted battery is connected to an exit point of lower water pressure and exhausted therefrom.

The invention possesses other objects and features, some of which, together with the foregoing, will be set forth in the following description of a preferred embodiment of the invention, and the invention will be more fully understood by reference to the attached drawings, in which:

Figure 3 is a side elevational view of a water activated battery having a preferred embodiment of the invention, the side of the battery being partially cut away to show the internal structure of the battery.

Figure 4 is a plan view of the bottom of the structure of Figure 3, clearly illustrating the invention.

Figure 5 is an end elevational view of the structure of Figure 3, partially broken away to show the vent check system.

Figure 1:
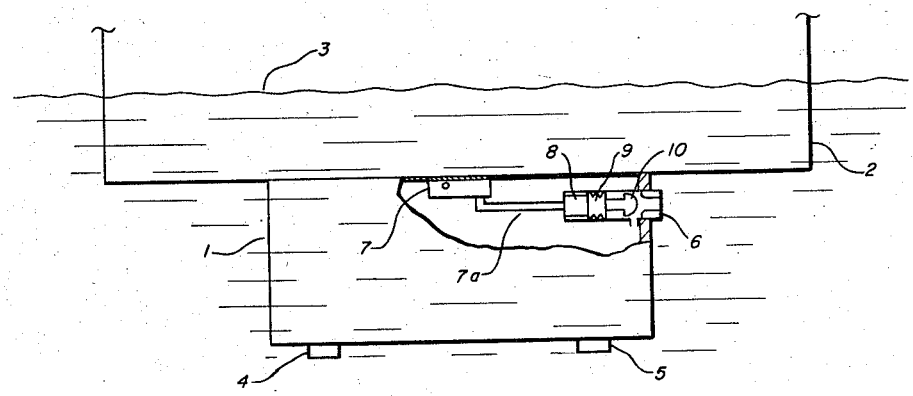
Figure 1 is a diagrammatic drawing which generally illustrates the action and structure of a water activated battery.
Figure 2:
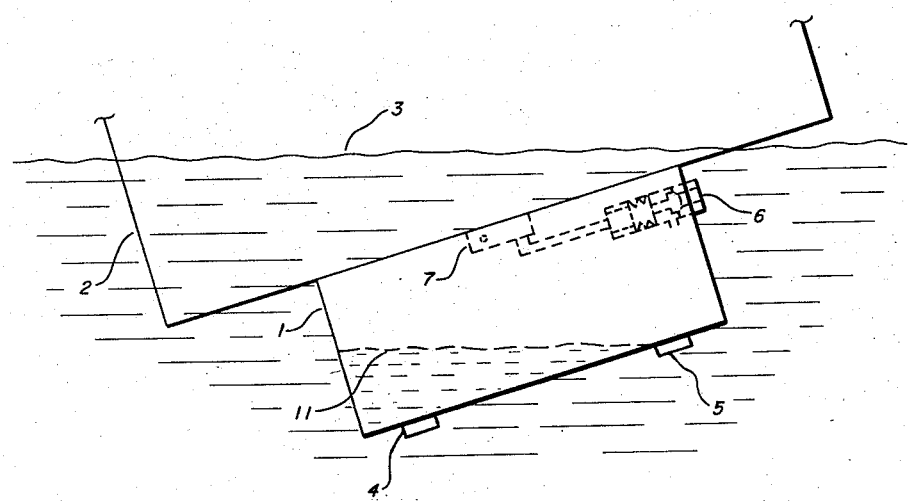
Figure 2 is a diagrammatic drawing showing the effect of a rocking float on the completeness of water expulsion from the battery.

Referring first to Figure 1, a battery 1 is shown attached to a float 2 which is assumed to have been just dropped into water. The water level reached on the float 2 is indicated by line 3. Water entering through ports 4 and 5 quickly fills the battery 1, the air within the battery 1 being exhausted through an upper vent 6. The schematically illustrated ports 4 and 5 in Figures 1 and 2 are correspondingly similar to those shown in Figure 4 labeled 4a and 5a. When the water reaches the top of the battery 1, a small secondary battery 7 shown in the cut away section also becomes filled with water. The small battery 7 is thus energized and, through leads 7a, fires a squib 8 which is, in actuality, a powder motor. A small quantity of gas is produced by the energization of the powder motor which, in turn, causes expansion of bellows 9. Very little smoke and solid combustion particles are produced by these powder motors. A valve plunger 10 cooperating with the bellows 9 is driven forward by the expanding bellows 9. The end of the plunger 10 is spherically shaped to fit tightly against the seat of vent 6, sealing the opening (see Figure 2).

The battery 1 is activated by the water, generating gas internally, which forces the water out through ports 4 and 5. The gas is continuously generated for the life of the battery. If the water is not forced outside the battery, it can cause shorting of the battery plates. The battery 1 operates satisfactorily in calm water as illustrated in Figure 1.

These batteries are frequently used on floats placed in the open sea which is generally choppy. Thus, the float 2 would rock in the water as indicated in Figure 2. This figure also illustrates the condition wherein a float riding in still water lists to one side, for example. A certain residue of seat water as represented by dotted line 11 can remain in the battery 1 and short out some of the plates because, for example, the internally generated gases can be exhausted through port 5, for the float position shown, without disturbing the remaining water residue. This residue of sea water can materially reduce the battery output voltage and, therefore, the effective life of the battery.

Of course, if the float should rock such that the battery oscillates generally on an axis perpendicular to a longitudinal plane (a plane perpendicular to a central longitudinal axis) of the battery, there is no problem because the exhaust ports are usually wide enough or are sufficient in number to spread across the width of the battery at both ends. Even if this were not exactly the case, the narrowness of the battery width in comparison to its length leaves little possibility of so much water remaining in the battery as to reach the plates, which are normally supported on small plastic blocks, raising the plates some height above the bottom of the casing.

This invention comprises a battery having a preferred purge system as shown in Figures 3, 4 and 5. The battery 1a is a conventional water activated battery having a series of pairs of magnesium and cuprous chloride plates 12 and 13, respectively, and cotton separator pads 14, which are all supported on small plastic blocks 15, as indicated in Figure 3. Battery output leads 16 connecting with the end plates of the series of magnesium and cuprous chloride plates are brought out of the casing through a water tight connector plug 16a. The plates are conventionally enveloped in a phenolic packing web (not shown) that insulates and positions them from the metallic casing. A small, secondary battery 7b is positioned near the top of the battery 1a and has output leads 17 which connect with check valve means for sealing vent 6a.

The check valve means, shown more clearly in Figure 5, are enclosed in a clear plastic block P which is suitably machined to accommodate the mechanism. A generally central bore houses a powder motor 8a (to which the secondary battery 7b output leads 17 are connected), bellows 9a and valve plunger 10a. Vent opening 6a is connected internally to battery 1a through a passageway connecting with internal opening 6b. The passageway connects with the central bore and the forward motion of plunger 10a caused by powder motor 8a in expanding the bellows 9a causes its head to seat at 10b to close off vent opening 6a from the internal opening 6b.

The novel purge system is most clearly illustrated in Figure 4. The exhaust ports 4a and 5a of the battery body 1a are respectively enclosed and isolated by water tight sheet metal enclosures 18 and 19 mounted on and sealed to the bottom of the battery. One end portion of a tubing 20 connects and extends into the enclosure 18 downwardly toward the far edge thereof (see Figure 3). The tubing 20 is soldered to enclosure 18 at its point of entry to provide a water tight connection. This tubing 20 extends back the length of battery 1a along the bottom as shown in Figures 3 and 4, such that its opposite end is located adjacent the opposite end of the battery, near the exhaust ports 5a. Similarly, tubing 21 connects with enclosure 19 and is extended back the length of battery 1a to open adjacent the far end thereof, near the exhaust ports 4a. Thus, the ports 4a, at one end of the battery, effectively open to sea water at the far end of the battery, near the position of ports 5a, and ports 5a at the opposite end effectively open to sea water at the first end, near ports 4a. In this way, the exhaust ports 4a and 5a are effectively crossed and extended to open at the remote ends of the battery 1a. It is apparent that the water pressure is effectively less at ports 4a than at ports 5a when the ports 4a are lower than ports 5a for the tilted battery position indicated in Figure 2, by virtue of the fact that ports 4a are effectively brought to and discharge at a higher water level. In such position, water is forced out through ports 4a and the elevated end of the connected tubing 20. Moreover, water will escape via that path, in preference to escape of gas through ports 5a and the lowered end of connected tubing 21, because of the higher water pressure at the discharge end of tubing 21 relative to that at the discharge end of tubing 20. Consequently, water remaining in a battery attached to a float placed in very rocky water or to a listing float in calm water, can be forced completely outside the battery, and the battery will operate satisfactorily at high efficiency and for a long life.

It should be noted that a water activated battery having the novel purge system above described works equally well in calm water as in extremely turbulent seas. The purge system is simple of construction and easily adaptable for use with various types and forms of water activated batteries. The use of the preferred purge system described and illustrated above has converted an ineffective water activated battery into a highly efficient and long life source of electrical energy. The invention is completely effective even where the battery is tilted to 90 degrees on its end. Thus, this invention can effectively be used with a liquid supply tank, for example, which is subject to large oscillatory motions, or which may be set at unusual angles, and an inert gas is provided under pressure into the tank as the liquid is exhausted for use to apparatus connected to the ends of the exhaust tubings. There are innumerable applications of this invention.

It is to be understood that the particular embodiment of the invention described above and shown in the drawings is merely illustrative of and not restrictive on the broad invention, and that various changes in design, structure and arrangement may be made without departing from the spirit and scope of the broader of the appended claims.

What is claimed is:

1. A liquid purge system for a container having in the lower portion thereof two horizontally spaced exhaust ports at a common vertical level, comprising: means for generating an internal fluid pressure in said container, and a pair of fluid conduits, each connected at one end to one of said exhaust ports, and extending to and discharging at its opposite end to the exterior of the container at a point located beyond the other of said exhaust ports and at a lower portion of said container.

2. A liquid purge system for a container having in the lower portion thereof two horizontally spaced exhaust ports at a common vertical level, comprising: means for generating an internal fluid pressure in said container, and a pair of fluid conduits, each connected at one end to one of said exhaust ports, and extending to and discharging at its opposite end to the exterior of the container at a point in the vicinity of the other of said exhaust ports.

3. A liquid purge system for an elongated container adapted for buoyant support in water, having a bottom exhaust port adjacent each of its ends, comprising: means for generating an internal fluid pressure in said container, and a pair of fluid conduits, each connected at one end to one of said exhaust ports, and extending therefrom to a point of discharge located adjacent the lower opposite end of the container.

4. A liquid purge system for an elongated container adapted for buoyant support in water, having a bottom exhaust port adjacent each of its ends, comprising: means for generating an internal fluid pressure in said container, and a pair of fluid conduits, each connected at one end to one of said exhaust ports, and extending therefrom to a point of discharge located in the region of the other of said exhaust ports.

5. A liquid purge system for a substantially rectangular container adapted for buoyant support in water, having a pair of laterally spaced bottom exhaust ports adjacent each of its ends, comprising: means for generating an internal fluid pressure in said container, and two fluid conduit systems, communicating respectively with a pair of bottom exhaust ports at the two ends of the container and each extending therefrom to discharge to the exterior adjacent the lower opposite end of the container.

6. The subject matter of claim 5, wherein said fluid conduit systems comprise chambers affixed to the bottom of the container over said laterally spaced pairs of exhaust ports, and a tubing extending along the bottom of said container from each of said chambers to a point of discharge adjacent the lower opposite end of the container.

References Cited in the file of this patent
UNITED STATES PATENTS
2,594,879    Davis _____ Apr. 29, 1952